United States Patent [19]

Tezuka

[11] Patent Number: 5,070,961

[45] Date of Patent: Dec. 10, 1991

[54] TORQUE DISTRIBUTION CONTROL SYSTEM FOR A FOUR-WHEEL DRIVE MOTOR VEHICLE

[75] Inventor: Kazunari Tezuka, Niiza, Japan

[73] Assignee: Fuji Jukogyo Kabushiki Kaisha, Tokyo, Japan

[21] Appl. No.: 556,734

[22] Filed: Jul. 20, 1990

[30] Foreign Application Priority Data

Aug. 28, 1989 [JP] Japan .................................. 1-222365

[51] Int. Cl.$^5$ ...................... B60K 17/35; B60K 28/16
[52] U.S. Cl. ................................... 180/249; 180/197; 364/426.03
[58] Field of Search .................. 180/197, 249, 248; 364/426.02, 426.03; 475/221, 249, 86

[56] References Cited

U.S. PATENT DOCUMENTS

| | | | |
|---|---|---|---|
| 4,215,593 | 8/1980 | Shono et al. ................ | 475/221 X |
| 4,538,700 | 9/1985 | Suzuki ......................... | 180/197 X |
| 4,776,424 | 10/1988 | Naito ........................... | 180/197 |
| 4,866,624 | 9/1989 | Nishikawa et al. .......... | 364/426.03 |
| 4,884,650 | 12/1989 | Fujiki et al. ................. | 180/248 X |
| 4,966,249 | 10/1990 | Imaseki ........................ | 180/197 X |
| 4,981,190 | 1/1991 | Nakayama et al. ........... | 180/197 |
| 4,986,388 | 1/1991 | Matsuda ....................... | 180/248 |

Primary Examiner—Kenneth R. Rice
Assistant Examiner—Kevin Hurley
Attorney, Agent, or Firm—Martin A. Farber

[57] ABSTRACT

A central differential distributes output torque of a transmission to front wheels and rear wheels of a vehicle. A fluid-operated restricting device is provided for restricting the differential operation of the central differential. The central differential is arranged to distribute a larger torque to the rear wheels than that to the front wheels. A slip ratio of the rear wheels is calculated, and a desired slip ratio is set based on driving conditions of the vehicle. A slip ratio deviation of the rear-wheel slip ratio from the desired slip ratio is obtained. The fluid-operated restricting device is operated in accordance with the slip ratio deviation, in such a manner that the restricting magnitude increases with an increase of the slip ratio deviation.

5 Claims, 5 Drawing Sheets

TORQUE DISTRIBUTION CONTROL SYSTEM FOR A FOUR-WHEEL DRIVE MOTOR VEHICLE

BACKGROUND OF THE INVENTION

The present invention relates to a torque distribution control system for a four-wheel drive motor vehicle having a central differential, and more particularly to a control system in which output torque of a transmission is unequally distributed to front wheels and rear wheels in accordance with driving conditions.

In a full-time four-wheel drive motor vehicle with a central differential, a fluid-operated multiple-disk friction clutch is provided for restricting the differential operation. The torque distributed to the front wheels and the rear wheels is controlled by changing the torque of the friction clutch, thereby improving straight-ahead stability, acceleration and driveability. In order to widely control the torque distribution, it is necessary for the central differential to be arranged to unequally distribute the torque to the front wheels and the rear wheels. There are two methods for the unequal distributing system. One is a front-weighed distribution which is weighed to the front wheels, and the other is a rear-weighed distribution which is weighed to the rear wheels. In the front-wheel weighed system, larger torque is transmitted to the front wheels. Accordingly, although the vehicle has good straight-ahead stability, the steerability deteriorates because of drifting out of the course. In the rear-wheel weighed system, the larger torque is transmitted to the rear wheels. The vehicle has good steerability and driveability on a dry road. However, the vehicle is liable to spin on a slippery road.

On the other hand, a disadvantage of the four-wheel drive vehicle is that all of the four wheels may slip (slipping spin) at the same time, causing difficulty in driving.

In order to ensure driving stability of the vehicle, the torque to the rear wheels is set to a larger value than that to the front wheels, so that the rear wheels may slip first. Thus, the vehicle can be safely driven by the front wheels at a small torque while the rear wheels idle.

Since the driving force (acceleration force) is distributed to the four wheels, each wheel can sustain a larger side force. Thus, in order to ensure driving stability in the rear-wheel weighed system, it is necessary to keep the sustainable side force of the rear wheels large.

The driving force and the side force change with the slip ratio of the wheel to the ground (slip ratio is described hereinafter in detail). The slip ratio changes in accordance with the condition of the road surface and the coefficient of friction of the tire. In particular, if the slip ratio is larger than a predetermined value (10 to 20%), the driving force and the sustainable side force remarkably reduce, which results in a deterioration of driving stability. Accordingly, the slip ratio of the rear wheel is controlled so as not to exceed the predetermined value. If the system operates to increase the torque distributed to the front wheels in accordance with the reduction of the sustainable side force, slipping of the rear wheels is prevented to ensure the driving force. Therefore, it is desirable to control the torque distribution based on the rear-wheel slip ratio.

Japanese Patent Applications Laid-Open 62-55228, 62-261539 and 63-8026 disclose four-wheel drive control systems in which a central differential comprising a simple planetary gear device is provided. Standard torque to the front and rear wheels is unequally distributed at a ratio determined by the difference between pitch circles of gears of the planetary gear device. Torque capacity of the clutch is controlled in accordance with the difference between speeds of the front wheels and the rear wheels, or with a predetermined value corrected by vehicle speed and steering angle.

Further, Japanese Patent Application Laid-Open 63-170129 discloses a control system in which the torque distribution is controlled in accordance with a drive wheel slip ratio. The torque distributed to the front wheels and the rear wheels is controlled so as to cause the drive wheel slip ratio to coincide with desired slip ratio for obtaining a large driving power of the wheels.

However, in the conventional systems, the standard torque distribution ratio determined by the ratio of the pitch circles can not be changed, unless the diameters of the gears change. However, it is difficult to change the diameters because of a limitation of space. Since the distribution of the torque to the rear wheels can not be set to a large value, the control range of the torque distribution becomes small.

Further, the torque distribution is controlled by restricting the differential operation of the central differential. Therefore, slip conditions of the wheels on the road surface can not be detected so that it is impossible to actively control the torque distribution in accordance with the slip conditions. In addition, on a road surface with a low coefficient of friction, if the vehicle is driven under slipping conditions and the speed difference is small, the torque distribution can not be controlled.

In the fourth conventional system, the slip ratio is controlled in accordance with $\mu - s$ characteristic (s: slip ratio) to obtain the desired slip ratio of 10 to 20% of providing a maximum driving force. The system aims at only improving driveability without considering driving stability, and hence it is not preferable to use such a system in an ordinary motor vehicle.

SUMMARY OF THE INVENTION

An object of the present invention is to provide a torque distribution control system for a four-wheel drive motor vehicle in which a large torque is distributed to rear wheels, thereby enabling control over a wide torque distribution range.

Another object of the present invention is to provide a system which may ensure driveability, driving stability and steerability in accordance with slip conditions.

According to the present invention, there is provided a system for controlling a torque distribution to front wheels and rear wheels of a motor vehicle having a transmission, a central differential for distributing an output torque of the transmission to the front wheels and the rear wheels of the vehicle, and a fluid-operated restricting device for restricting differential operations of the central differential.

The system further includes the central differential being arranged to distribute a larger torque to the rear wheels than to the front wheels, first calculator means for calculating a slip ratio of the rear wheels, setting means for setting a desired slip ratio in accordance with driving conditions of the vehicle, second calculator means for producing a slip ratio deviation of the rear-wheel slip ratio from the desired slip ratio, means responsive to the slip ratio deviation for setting a restricting torque for determining restricting torque of the fluid-operated restricting device to a value which increases with an increase of the slip ratio deviation, and control means responsive to the restricting torque for operating the fluid-operated restricting device.

In another respect, the desired slip ratio varies with an inverted V-shape characteristic line as lateral acceleration increases.

The other objects and features of this invention will become understood from the following description with reference to the accompanying drawings.

DETAILED DESCRIPTION OF THE PREFERRED EMBODIMENT

Figure 1A:
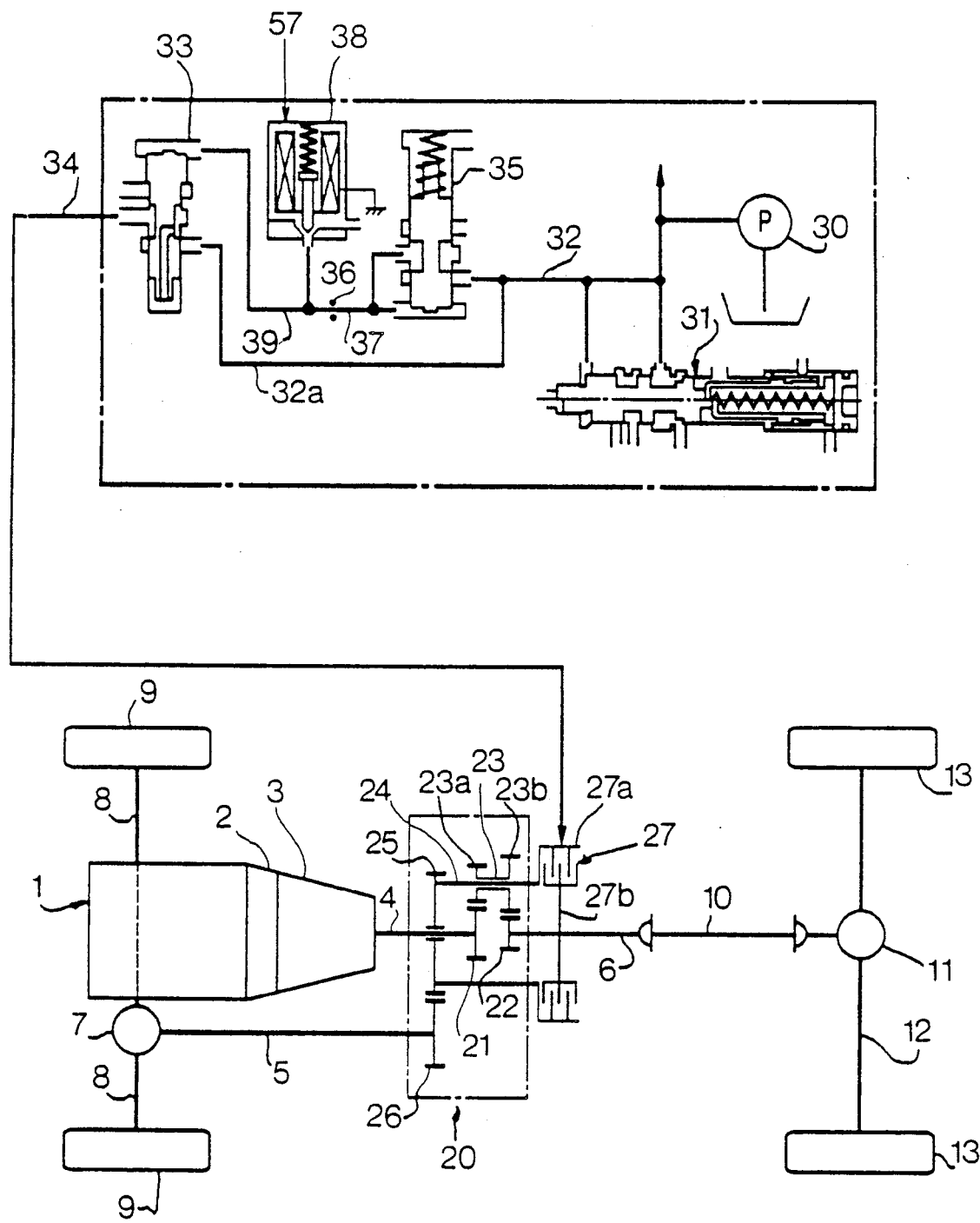
FIGS. 1a and 1b are schematic diagrams showing a power transmission system for a four-wheel drive motor vehicle according to the present invention.

FIG. 1a shows a power transmission system for a four-wheel drive motor vehicle having a central differential according to the present invention. An engine 1 is mounted on a front portion of the vehicle. A clutch 2 and an automatic transmission 3 are operatively connected at the rear of the engine 1 in the longitudinal direction of the vehicle. An output of the automatic transmission 3 is transmitted to an output shaft 4 which is aligned with a central differential 20 for rearwardly transmitting the torque. The output shaft 4 is connected via the central differential 20 to a front drive shaft 5 which is disposed in parallel under the automatic transmission 3 through a pair of reduction gears 25 and 26 of the central differential 20. The front drive shaft 5 is connected to the front wheels 9 through a front differential 7 and axles 8. The output shaft 4 is connected to a rear drive shaft 6 through the central differential 20. The rear drive shaft 6 is connected to the rear wheels 13 through a propeller shaft 10, a rear differential 11 and axles 12.

The central differential 20 is a complex planetary gear device and comprises a first sun gear 21 integrally formed on the output shaft 4, a second sun gear 22 integrally formed on the rear drive shaft 6, and a combined planet pinion 23 comprising a first planet pinion 23a meshed with the first sun gear 21, and a second planet pinion 23b meshed with the second sun gear 22, and supported on a carrier 24. The carrier 24 is connected to the reduction drive gear 25.

Thus, the output torque from the output shaft 4 of the transmission 3 is transmitted to the carrier 24 and the second sun gear 22 through the first sun gear 21 and pinions 23a, 23b at predetermined respective torque distribution ratios. The difference between the rotating speeds of the carrier 24 and the second sun gear 22 is absorbed by the rotation and revolution of the first and second planet pinions 23a and 23b.

In the central differential 20, the first sun gear 21 is engaged with the first planet pinion 23a and the second sun gear 22 is engaged with the second planet pinion 23b.

Consequently, the standard torque distribution for the front torque $T_F$ and the rear torque $T_R$ can be set to various values by changing the radii of the pitch circles of the sun gears 21 and 22 and pinions 23a and 23b.

Thus, the torque distribution ratio of the front wheels and the rear wheels is determined, for example as $$T_F : T_R = 34 : 66$$

A large standard torque can be distributed to the rear wheels 13.

A fluid-operated multiple-disk friction clutch 27 is provided adjacent the central differential 20 for restricting the differential operation of the central differential 20.

The clutch 27 comprises a drive drum 27a secured to the carrier 24, and a driven drum 27b secured to the rear drive shaft 6. When a differential operation restricting clutch torque Tc is produced in the clutch 27, a part of the output torque of the second sun gear 22 is transmitted to the front wheels 9, thereby changing the distribution of the torque. The carrier 24 is coupled with the second sun gear 22 when the clutch 27 is entirely engaged, thereby locking the central differential 20.

In a vehicle with a front-mounted engine, the static weight distribution of front static weight WF and rear static weight WR are determined for example as $$WF : WR \approx 62 : 38$$

when the clutch is directly engaged, and the distribution ratio of the front torque and rear torque is equal to the dynamic weight distribution. Thus, the torque distribution is controlled in the range between the standard torque distribution weighted to the rear wheels and the torque distribution at the complete engagement of the clutch in accordance with the differential operation restricting clutch torque Tc.

A hydraulic circuit of a control system for the clutch 27 comprises an oil pump 30, a pressure regulator valve 31, a pilot valve 35, a clutch control valve 33 and a solenoid-operated duty control valve 38. The regulator valve 31 operates to regulate the pressure of oil supplied from the oil pump 30 driven by the engine to produce line pressure and the line pressure is applied to a line pressure conduit 32. The conduit 32 is communicated with a passage 37 through the pilot valve 35. The passage 37 is communicated with the solenoid-operated duty control valve 38 downstream of an orifice 36, and with an end of the clutch control valve 33 through a passage 39. The conduit 32 is communicated with the clutch control valve 33 through a passage 32a. The clutch control valve 33 is communicated with the clutch 27 through a passage 34. The solenoid-operated valve 38 is operated by pulses from a control unit 50 at a duty ratio determined therein, thereby controlling draining of the oil to provide a control pressure. The control pressure is applied to the clutch control valve 33 to control the oil supplied to the clutch 27 so as to control the clutch pressure (torque) and hence the differential operation restricting clutch torque Tc.

Describing an electronic control system, a principle for controlling the torque distribution is described hereinafter.

The torque distribution is controlled by a feedback control so as to cause the slip ratio of the rear wheels to converge to a desired slip ratio so that the rear wheels 13 slip first.

The slip ratio S of the rear wheels 13 is represented as follows with the vehicle ground speed V, the radius of the tire r, and the rear-wheel angular velocity $\omega R$.

$$S = (r \cdot \omega R - V)/r \cdot \omega R$$

If the rear-wheel slip ratio S is controlled in a linear range of S<Sa at torque distribution 3:7, the front-wheel slip ratio S becomes small to be approximately equal to the vehicle speed. Namely, the ground speed V is $$V \approx r \cdot \omega F$$

where $\omega F$ is the front-wheel angular velocity and r is the radius of the tire. Thus, the slip ratio S of the rear wheels is represented as follow.

$$S = (r \cdot \omega R - r \cdot \omega F)/r \cdot \omega R = (\omega R - \omega F)/\omega R$$

A proper desired slip ratio is determined in consideration of steering angle, vehicle speed, lateral acceleration and other factors, which will be described hereinafter.

Figure 1B:
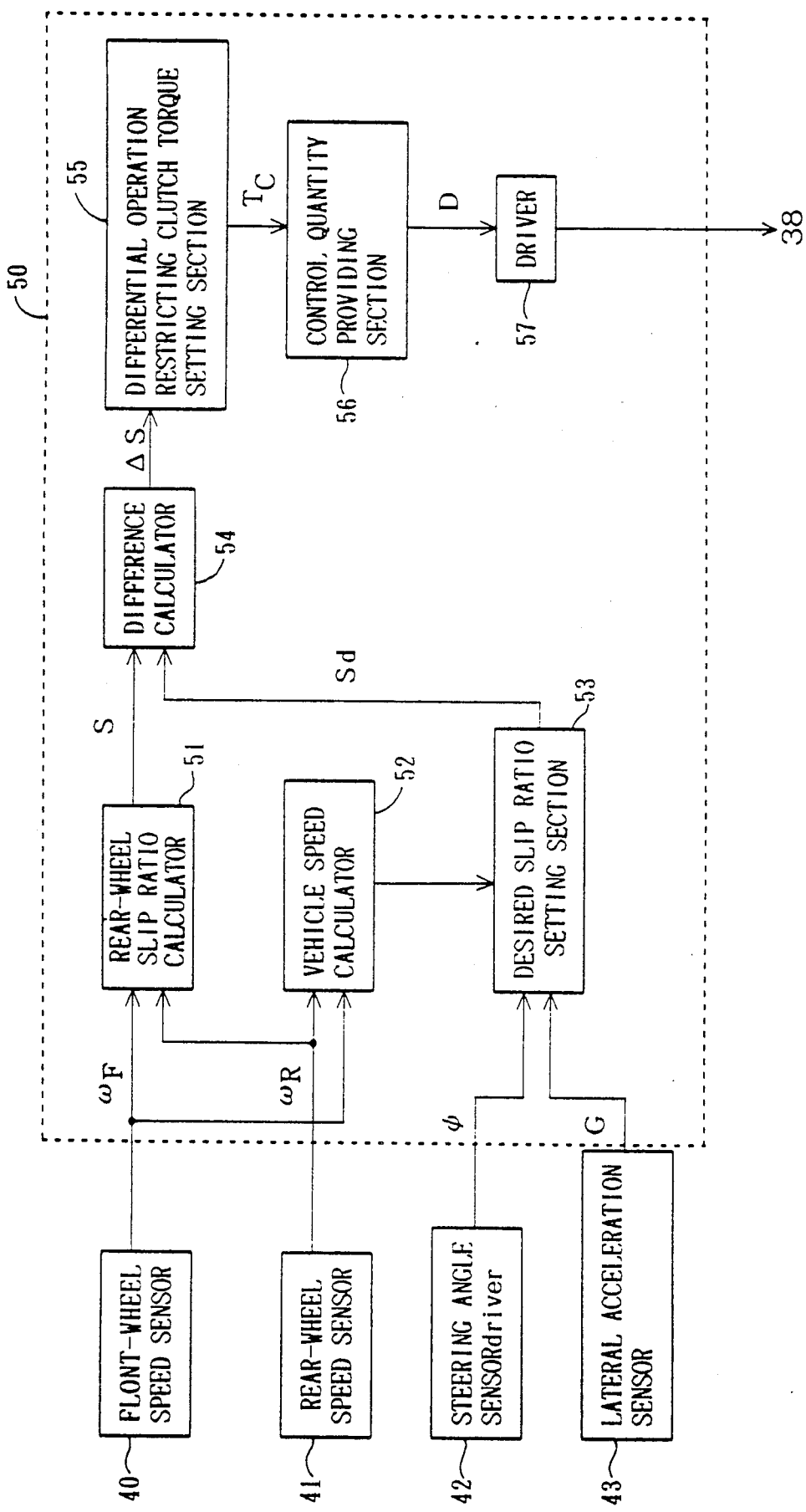
Figure 2A:
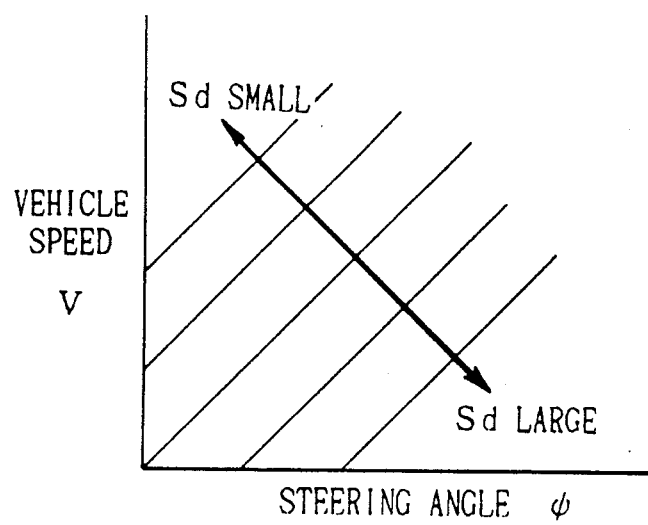
FIGS. 2a and 2b are graphs showing characteristics of a desired slip ratio corresponding to vehicle speed, steering angle, and lateral acceleration, respectively.

The control unit 50 (FIG. 1b) is supplied with output signals from a front-wheel speed sensor 40, a rear-wheel speed sensor 41, a steering angle sensor 42 and a lateral acceleration sensor 43. The control unit 50 has a slip ratio calculator 51 to which front-wheel angular velocity $\omega F$ and rear-wheel angular velocity $\omega R$ from the sensors 40 and 41 are applied. In the slip ratio calculator 51, a slip ratio S is calculated in accordance with the above mentioned equations. The front-wheel angular velocity $\omega F$ and the rear-wheel angular velocity $\omega R$ are applied to a vehicle speed calculator 52 in which vehicle speed V is calculated in accordance with the average of both of the angular velocities. The vehicle speed V, steering angle $\psi$ from the steering angle sensor 42, and lateral acceleration G from the lateral acceleration sensor 43 are applied to a desired slip ratio setting section 53. In the section 53, a desired slip ratio Sd is determined in accordance with the input signals for correcting the actual slip ratio S so as to improve the driving stability in a high vehicle speed range and cornering stability. The desired slip ratio Sd corresponding to the vehicle speed V and the steering angle $\psi$ is shown in FIG. 2a. When the vehicle makes a turn at a large steering angle and a low vehicle speed, the desired slip ratio Sd is set to a large value so that the steerability is improved. At a small steering angle at a high speed, the desired slip ratio Sd is small for improving the driving stability in a high speed range.

Figure 2B:
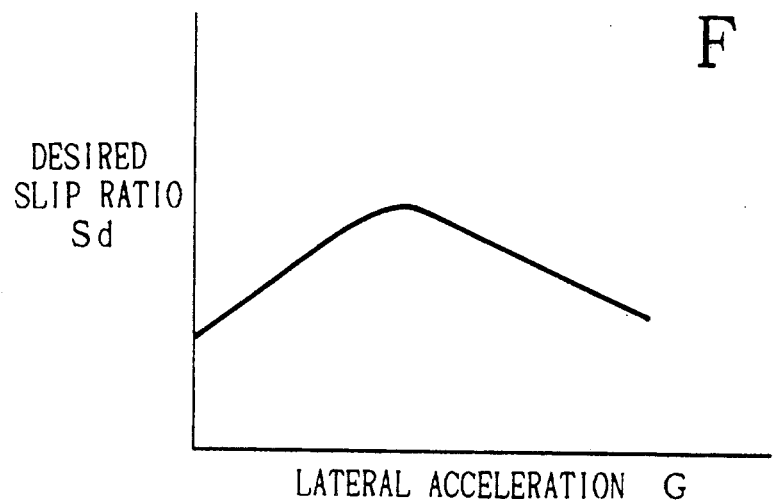

As another method for providing the desired slip ratio, the slip ratio Sd corresponding to the lateral acceleration G is shown in FIG. 2b. In accordance with an increase of the lateral acceleration G, the desired slip ratio Sd varies with an inverted V-shaped characteristic line. When the lateral acceleration G is small in an early stage of cornering, the desired slip ratio Sd is small so that large torque is distributed to the front wheels 9 for obtaining driving stability. When the vehicle is turning, the lateral acceleration G is increased, and hence the desired slip ratio Sd is increased. Thus, a large torque is transmitted to the rear wheels 13 to produce good steerability. In a later stage of the turning, the lateral acceleration G is further increased, and the desired slip ratio Sd is reduced. Thus, large torque is transmitted to the front wheels 9, thereby improving driving stability and increasing allowable lateral acceleration. Consequently, it is possible to turn with good driving stability and steerability.

The rear-wheel slip ratio S and the desired slip ratio Sd are applied to a difference calculator 54 in which a difference $\Delta S$ is calculated by S=S−Sd. The difference $\Delta S$ is applied to a differential operation restricting clutch torque setting section 55. In accordance with the input signal, the clutch torque setting section 55 retrieves a restricting clutch torque Tc from a look up table.

Figure 2C:
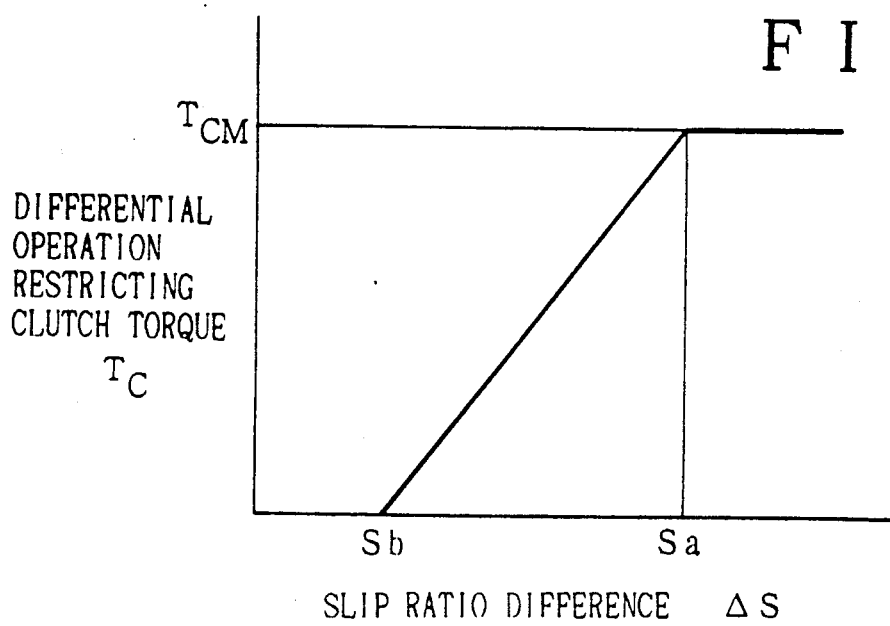
FIG. 2c is a graph showing differential operation restricting clutch torque.

FIG. 2c shows clutch torque Tc stored in the look-up table. The clutch torque Tc is an increasing function of the difference $\Delta S$ in a control range $\Delta Sb < \Delta S < \Delta Sa$.

The clutch torque Tc is applied to a control quantity providing section 56 where a duty ratio D corresponding to the derived clutch torque Tc is provided. A duty ratio D provided at the section 56 is applied to the solenoid-operated duty control valve 38 through a driver 57.

Figure 3:
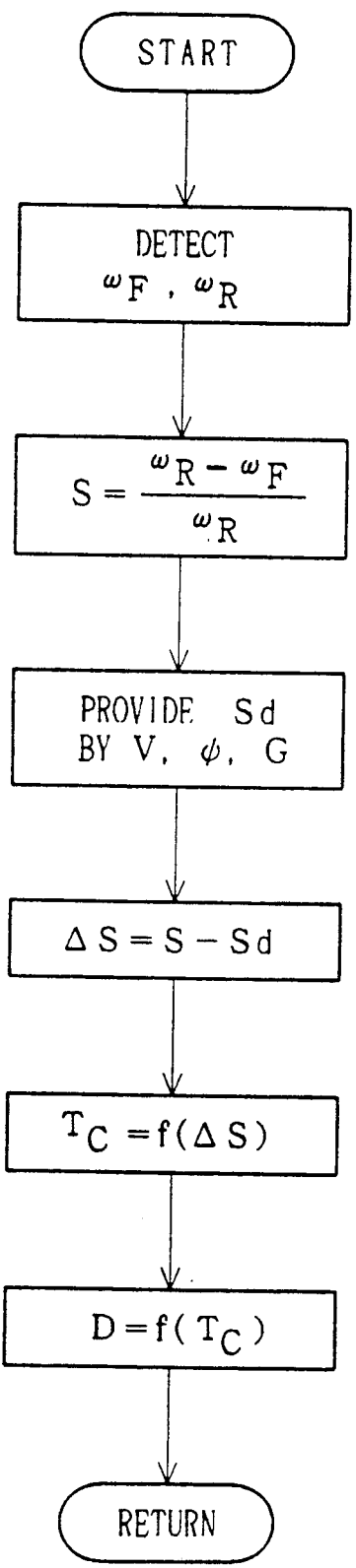
FIG. 3 is a flowchart showing an operation of a control unit in the system.
Figure 4A:
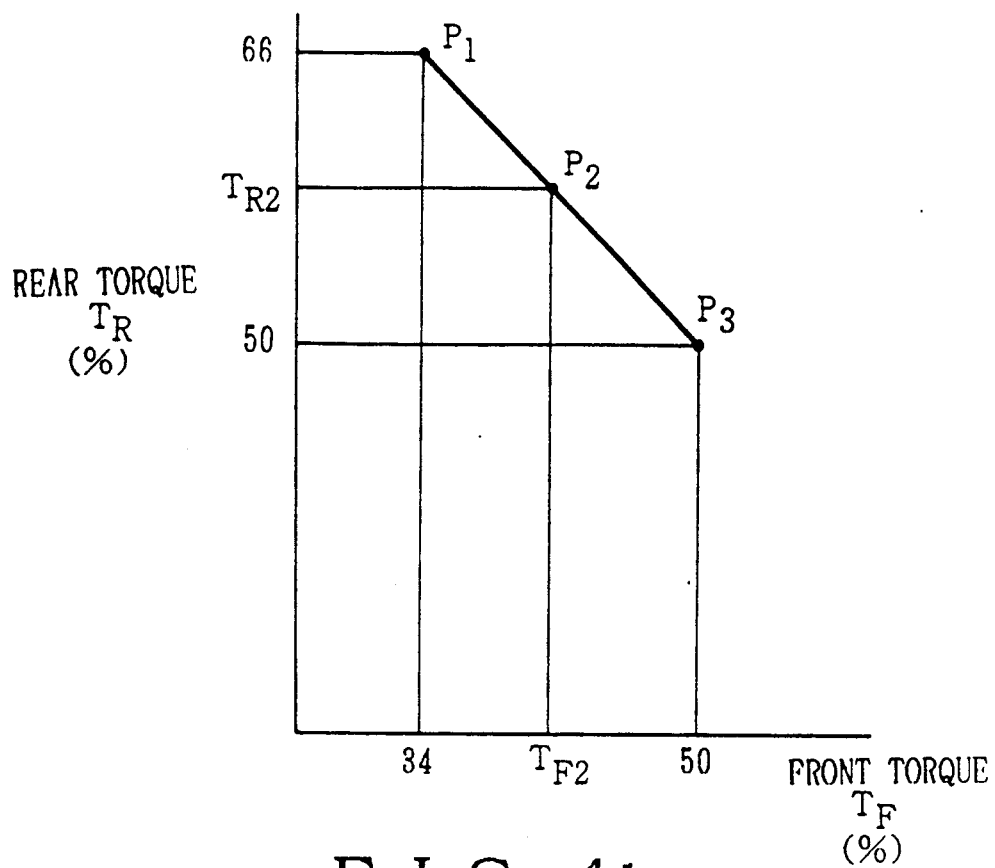
FIG. 4a is a graph showing a relationship between front-wheel torque and rear-wheel torque.
Figure 4B:
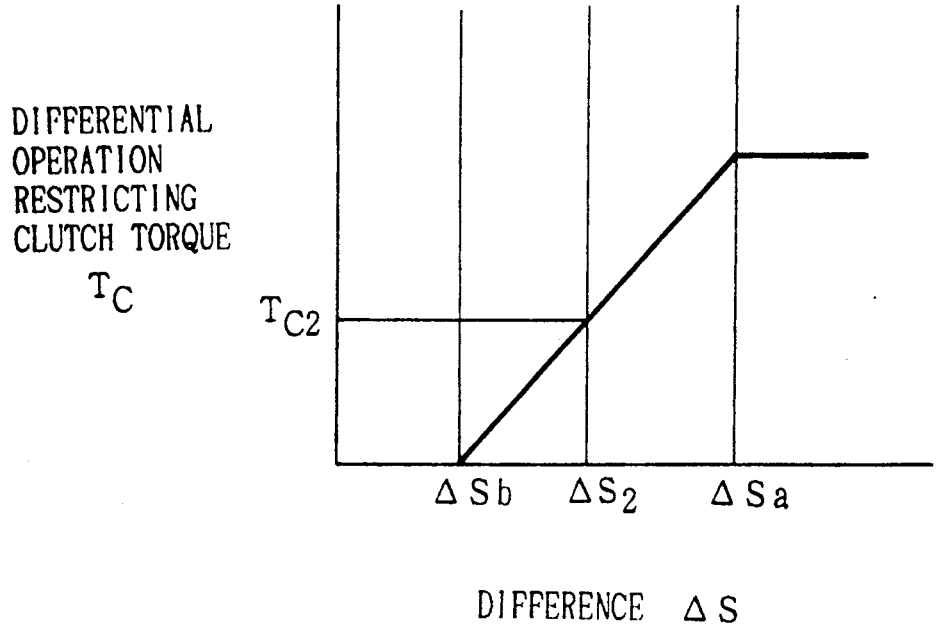
FIG. 4b is a graph showing a characteristic of differential operation restricting clutch torque in accordance with a rear-wheel slip ratio.

The operation of the system will be described hereinafter with reference to the flowchart of FIG. 3 and the graphs of FIG. 4. The power of the engine 1 is transmitted to the transmission 3 through the clutch 2 at which the transmission ratio is automatically controlled. The output of the transmission is transmitted to the first sun gear 21 of the central differential 20. The front torque $T_F$ and the rear torque $T_R$ are determined in accordance with the radii of gears of the central differential 20. The torque is transmitted to the reduction gear 25 through the carrier 24 at a ratio of 34% for example and to the second sun gear 22 at the ratio of 66%.

The front-wheel angular velocity $\omega F$ and the rear-wheel angular velocity $\omega R$ are detected by the front-wheel speed sensor 40 and the rear-wheel speed sensor 41. The rear-wheel slip ratio S is calculated in the rear-wheel slip ratio calculator 51 in accordance with the front-wheel angular velocity $\omega F$ which approximates the vehicle speed. The desired slip ratio Sd is retrieved from the look-up table in the desired slip ratio setting section 53 in accordance with the vehicle speed V and the steering angle $\psi$. The desired slip ratio Sd can be retrieved from the look-up table in accordance with the lateral acceleration G. In the difference calculator 54, the difference $\Delta S$ between the rear-wheel slip ratio S and the desired slip ratio Sd is calculated.

If a no slip state ($\Delta S \leq \Delta Sb$) is detected in the control unit 50 while the vehicle is driven on a dry road having a high coefficient of friction $\mu$, the clutch torque Tc is determined to be zero. A signal corresponding to a large duty ratio is applied to the solenoid-operated duty control valve 38. Thus, the clutch control pressure becomes zero and the clutch control valve 33 operates to close the passage 32a, thereby draining the oil from the clutch 27. The clutch 27 is disengaged and the clutch torque Tc becomes zero so as to render the central differential 20 free.

Accordingly, the torque of the reduction drive gear 25 is transmitted to the front wheels 9 through the reduction driven gear 26, the front drive shaft 5 and the front differential 7 at the ratio of 34%. The torque at the distribution ratio of 66% is transmitted to the rear wheels 13 through the second sun gear 22, the rear drive shaft 6, the propeller shaft 10 and the rear differential 11. Thus, a full-time four-wheel driving is established at a point P1 of FIG. 4a.

When the vehicle turns, the rotating difference in speeds of the front wheels 9 and the rear wheels 13 is absorbed by rotation of the first and second pinions 23a and 23b, so that the vehicle smoothly negotiates a sharp corner due to the differential operation of the central differential 20.

If the vehicle is driven on a slippery road, the rear wheels 13 slip first because the larger amount of the torque is distributed to the rear wheels 13. If the calculated difference $\Delta S$ becomes a value $\Delta S2$ in the control range, the driving of the rear wheels 13 is unstable. Therefore, a differential operation restricting clutch torque T2 is determined corresponding to the slip ratio S2. Consequently, the clutch torque $Tc_2$ is produced in the clutch 27. The clutch 27 is provided in parallel with the carrier 24 and the second sun gear 22 of the central differential 20. Accordingly, the torque is transmitted from the second sun gear 22 to the carrier 24 to increase the torque to the front wheels 9. Thus, the distribution ratio of the front torque and the rear torque $T_F:T_R$ becomes $T_{F2}:T_{R2}$ at a point P2 of FIG. 4a. To the contrary, the torque to the rear wheels 13 is reduced to eliminate slipping, thereby improving driveability to ensure good operability and safe driving.

When the difference $\Delta S$ becomes larger than the value $\Delta Sa$ ($\Delta S \geq \Delta Sa$) and the driving is extremely unstable, the differential operation restricting torque Tc becomes maximum. Thus, the carrier 24 is directly engaged with the second sun gear 22 to lock the central differential 20. Thus, the entirely coupled four-wheel driving is established in accordance with the torque ratio distribution ratio 50:50, which is the same as the weight distribution of the front dynamic weight Wf and the rear dynamic weight Wr, corresponding to the axle loads of the front and the rear wheels at a point P3 of FIG. 4a. Thus, the torque distribution is continuously controlled in accordance with the slipping condition for preventing the wheels from slipping.

In accordance with the present invention, since large torque is transmitted to the rear wheels through the central differential, driving stability for the four-wheel drive system as well as cornering stability are improved.

The rear-wheel slip ratio is calculated and the differential operation restricting clutch torque is determined in accordance with the difference between the rear-wheel slip ratio and the desired slip ratio corresponding to the driving conditions for controlling the torque distribution. Since slipping of the wheels is prevented, stability and driveability in dependency on the driving conditions are provided.

Since the rear-wheel slip ratio is corrected in accordance with the desired slip ratio obtained by the vehicle speed and the steering angle or lateral acceleration, driving stability in a high vehicle speed range, steerability and cornering characteristics are further improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a control system for controlling torque distribution to front wheels and rear wheels of a four-wheel drive vehicle having a transmission, the control system comprising a front wheel speed sensor, a rear wheel speed sensor, differential means for allowing differential operation between the front wheels and the rear wheels and for distributing output torque from the transmission to the front wheels and the rear wheels, and restricting means for restricting differential operation of the differential means, the improvement in the control system wherein:

said differential means is arranged to distribute a larger torque to the rear wheels than to the front wheels when said differential means is free;

a lateral acceleration sensor for determining a lateral acceleration of the vehicle and for generating a lateral acceleration signal;

slip ratio calculating means responsive to signals from said front wheel speed sensor and said rear wheel speed sensor for calculating an actual slip ratio of the rear wheels;

setting means responsive to said lateral acceleration signal for setting a desired slip ratio;

slip ratio deviation calculating means for calculating a slip ratio deviation of said actual slip ratio from said desired slip ratio;

restricting torque setting means responsive to said slip ratio deviation for obtaining a differential operation restricting torque which comprises an increasing function of said slip ratio deviation; and control means for operating said restricting means in accordance with said differential operation restricting torque to change torque distribution ratio to the front wheels and the rear wheels so as to obtain an improvement in driving stability and cornering characteristics.

2. The system according to claim 1, wherein said restricting torque setting means includes a look-up table containing said differential operation restricting torque as the increasing function of said slip ratio deviation.

3. The system according to claim 1, wherein said setting means is further responsive to vehicle speed for setting said desired slip ratio.

4. The system according to claim 1, wherein said desired slip ratio varies with an inverted V-shape characteristic line as lateral acceleration increases.

5. The system according to claim 1, wherein said setting means is further responsive to steering angle for setting said desired slip ratio.

* * * * *